United States Patent
Kennedy et al.

(10) Patent No.: US 11,491,722 B2
(45) Date of Patent: Nov. 8, 2022

(54) APPARATUS FOR SPRAY DEPOSITION

(71) Applicant: EFFUSIONTECH Pty Ltd, Bayview (AU)

(72) Inventors: Byron John Kennedy, Bonbeach (AU); Steven Peter Camilleri, Bayview (AU); Lyell Douglas Embery, Stuart Park (AU); Sylvain James Laversanne, Coburg (AU); Toby John Jarrett, Dingley Village (AU)

(73) Assignee: EFFUSIONTECH IP PTY. LTD., Dandenong (AU)

( * ) Notice: Subject to any disclaimer, the term of this patent is extended or adjusted under 35 U.S.C. 154(b) by 363 days.

(21) Appl. No.: 16/603,079

(22) PCT Filed: Apr. 4, 2018

(86) PCT No.: PCT/AU2018/050308
§ 371 (c)(1),
(2) Date: Oct. 4, 2019

(87) PCT Pub. No.: WO2018/184066
PCT Pub. Date: Oct. 11, 2018

(65) Prior Publication Data
US 2020/0147883 A1    May 14, 2020

(30) Foreign Application Priority Data
Apr. 6, 2017    (AU) .................... 2017901251

(51) Int. Cl.
*B29C 64/321*    (2017.01)
*B33Y 30/00*    (2015.01)
(Continued)

(52) U.S. Cl.
CPC .......... *B29C 64/321* (2017.08); *B29C 64/209* (2017.08); *B29C 64/393* (2017.08);
(Continued)

(58) Field of Classification Search
CPC ... B29C 64/209; B29C 64/321; B29C 64/393; B33Y 30/00; B33Y 50/02; B33Y 40/00; C23C 24/04; C23C 4/134
See application file for complete search history.

(56) References Cited

U.S. PATENT DOCUMENTS 9,139,912 B2 *    9/2015    Kim ........................ C23C 24/04
2014/0117109 A1 *    5/2014    Widener ................. C23C 24/04
                                                                                239/135
(Continued)

FOREIGN PATENT DOCUMENTS

CN    103317590 A    9/2013

*Primary Examiner* — Philip C Tucker
*Assistant Examiner* — Evan T Hulting
(74) *Attorney, Agent, or Firm* — Welsh Flaxman & Gitler LLC

(57) ABSTRACT

An apparatus for producing a three-dimensional object by spray deposition including a powder conveyance line A arranged to channel a flow of spray material entrained in a carrier gas to a nozzle (a first flow). The apparatus also has a process line B arranged to channel a flow of gas to the nozzle (a second flow). The apparatus also has a spray nozzle. The apparatus is such that pressure and temperature parameters of the first flow are controlled in real time, but for the second flow these parameters are not controlled in real time. The two flows merge to cause spray material to be propelled from the nozzle to a substrate to create a three-dimensional object.

8 Claims, 1 Drawing Sheet

(51) Int. Cl.
*B33Y 40/00* (2020.01)
*B33Y 50/02* (2015.01)
*B29C 64/209* (2017.01)
*B29C 64/393* (2017.01)

(52) U.S. Cl.
CPC .............. *B33Y 30/00* (2014.12); *B33Y 40/00* (2014.12); *B33Y 50/02* (2014.12)

(56) References Cited

U.S. PATENT DOCUMENTS

| | | |
|---|---|---|
| 2015/0323053 A1 | 11/2015 | El-Wardany et al. |
| 2016/0030632 A1 | 2/2016 | Schleicher et al. |
| 2016/0068793 A1* | 3/2016 | Maggiore ............. B29C 64/227 435/289.1 |

* cited by examiner

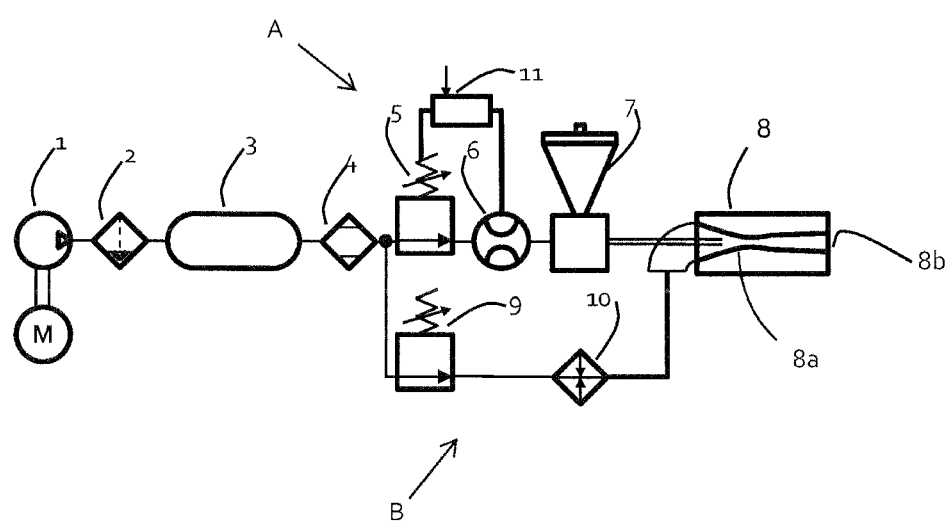

APPARATUS FOR SPRAY DEPOSITION

FIELD OF INVENTION

This invention relates apparatus for spray deposition for forming a three-dimensional object.

BACKGROUND

It is known to form three-dimensional objects with cold spray techniques. The spray material used may involve metallic, ceramic, polymer or any other suitable particles. The spray may be applied to a three-dimensional substrate in layers to eventually form the desired shape. In some known systems the cold spray process is complex due to the need to incorporate and control a supersonic flow of spray powder. This may place a high demand on computerised systems which govern the deposition process.

In some systems cold spraying involves use of a high velocity (eg 300 to 1200 m/s) gas jet to accelerate 1 to 50 μm powder particles onto the substrate. The particles contact the substrate at supersonic speeds and plastically deform, bonding on impact. As the particles continue to bombard the system they 'stack' to form the targeted three-dimensional shape. If proper control parameters are used then the bonds which form between particles can be very strong, therefore facilitating the production of a high quality product.

Some known cold spray systems involve:
- a heated and pressurized gas source to provide kinetic energy to the spray particles;
- a powder feeding system to provide particles for the spray;
- a converging-diverging applicator nozzle to achieve the necessary supersonic speed of the particles (eg as available from De Laval);
- a substrate for receiving the particles; and
- an electronic control system to monitor and regulate spray parameters (eg speed and temperature).

The manner in which these components are configured and the way they manipulate process variables determines whether one has a low pressure spray system or a high pressure spray system. These known systems have a main or 'process line' which delivers a stream of high velocity gas, and a 'conveying line' to deliver, by way of a secondary gas stream, spray powder from a feeder to the main gas stream. The process line is arranged prior to, or in other words upstream of, the most constricted point of the nozzle. The powder conveying line can either be upstream (for high pressure systems) or downstream (for low pressure systems) with respect to the nozzle.

Low pressure systems may enable the use of less complicated control features, less expensive equipment, and higher degrees of system portability. However, these benefits may be offset by relatively low deposition rates and low quality deposition of spray material on a substrate, due to sub-optimal particle velocity.

High pressure systems generally require compressed gas at high pressure to convey the powder from the powder feeder to the nozzle. Helium has been known to perform well for high pressure cold spray techniques, but it can be relatively expensive. Helium recovery systems exist, but they can be complex and may only provide reasonably limited extension to the life of the helium used. Nitrogen, for example in liquid form, is generally less expensive but may not perform as well. High pressure cold spray may be used for high margin work such as military and aviation casting and repair work. Relying on purified, zero moisture process gases such as liquid nitrogen, is the norm.

High pressure cold spray systems are usually preferred as they tend to produce significantly higher particle velocities, which usually gives better deposition and finished product quality. The injection of the powder on the high pressure side of the nozzle may maximize particle impact speed and minimise undesired variation. Such systems may eliminate an otherwise turbulent mixing region in a venturi. Removal of the venturi normally present in low pressure systems may reduce undesired variation in particle speeds. This said, high pressure systems may still suffer from variations in deposition velocity due to control system fluctuations. These fluctuations may make the deposition process unpredictable.

Particle velocity prior to impact is usually an important variable in a cold spray system. Without enough velocity the particles may not bond, and with too much velocity the particles may erode particles already deposited. To keep process performance high, it is usually necessary to maintain a high particle impact velocity. This may improves final material performance and deposition efficiency. An ideal cold spray system would achieve a stable, jet stream which can transport spray particles to a substrate with consistent high velocity, within the particle deposition range.

The velocity of a fluid is closely interrelated to its flow rate. Within the field there is a known equation for mass flow rate through a De Laval nozzle[1]:

[1]John D. Anderson, *Modern Compressible Flow,* $3^d$ Ed, page 216.

$$\dot{m} = \frac{p_0 A^*}{\sqrt{T_0}} \sqrt{\frac{\gamma}{R}\left(\frac{2}{\gamma+1}\right)^{\frac{\gamma+1}{\gamma-1}}}$$

Where:

$\dot{m}$=mass flow rate in kilograms per second $p_o$=nozzle reservoir pressure in Pascals $A^*$=nozzle throat area in square meters $T_o$=nozzle reservoir temperature in Kelvins $\gamma$=the gas adiabatic expansion ratio R=the specific gas constant Referring to the equation, if the geometry of the nozzle, the gas pressure, the gas temperature and several constants are known, then the mass flow rate can be determined. It is due to this calculable relationship that some known cold spray systems focus on providing and/or controlling the most appropriate temperature, pressure, the nozzle dimensions, or a specific configuration or control of these parameters.

The mass rate of process gas through a typical high pressure cold spray system is regulated by measuring the flow rate, and adjusting both temperature and pressure to achieve the desired result. Generally, the mass ratio (between the spray powder and process gas) is held at around 5%. This is done by measuring gas mass rate and by measuring gas flow through the main process line, and regulating delivery of spray material from the powder feeder.

Gas pressure in the powder conveying line is maintained a pre-set level to ensure that the supply of spray powder to the nozzle is consistent. The spray material feeder has an injector tube of small diameter so as to maximise gas velocity in the powder feed tube. The applicant has found that notwithstanding such pre-settings, flow through the injector may vary substantially. This may affect particle velocity and thus deposition consistency.

Typical high pressure cold spray solutions measure temperature, pressure and mass flow, and control these, for the main process line and sometimes also for the powder conveying line. Providing equipment for such measurement and control can be resource intensive and expensive.

OBJECT OF THE INVENTION

It is an object of a preferred embodiment of the invention to provide apparatus for spray deposition wherein gas flow in a spray material feeder line is regulated to achieve good deposition. While this applies to the preferred embodiment, it should be understood that the object of the invention per se is simply to provide a useful choice. Accordingly, any objects of advantages of preferred embodiments should not be seen as a limit on claims expressed more broadly.

Definitions

The term 'comprising' if and when used in this document in relation to a combination of features or steps does not rule out the option of there being further unnamed features or steps. The term is therefore inclusive, not exclusive.

References to control in "real time" relate to adjustments made to parameters while effective spray deposition on the substrate occurs, as opposed to setting parameters prior to such deposition.

SUMMARY OF THE INVENTION

According to one aspect of the invention, there is provided apparatus for producing a three-dimensional object by spray deposition; having:
 a first line arranged to channel a flow of spray material entrained in a carrier gas to a nozzle (a first flow);
 a second line arranged to channel a flow of gas to the nozzle (a second flow); and a spray nozzle;
the apparatus being such that pressure and temperature parameters of the first flow are controlled in real time, but for the second flow these parameters are not controlled in real time, and wherein the two flows merge to cause spray material to be propelled from the nozzle to a substrate to create a three-dimensional object.

Optionally the first line comprises sensing means for sensing gas flow parameters in the first line.

Optionally the first line comprises a spray material feeder for feeding spray material to gas moving through the first line.

Optionally the apparatus incorporates pressure and temperature sensors for gas in the first line and these communicate readings to an electronic controller which, in response to the readings, causes adjustments to the pressure and temperature of the gas in the first line to provide the spray material with desired spray characteristics as it leaves the nozzle.

Optionally the controller controls the amount of spray material fed into gas moving through the first line.

Optionally the first and second lines receive gas from a common reservoir.

Optionally there is a filter which filters gas prior to it entering the reservoir.

Optionally the gas comprises compressed air.

Optionally the compressed air is run through a dehumidifier prior to entering the first and second lines.

Optionally the nozzle is a converging-diverging nozzle arranged to receive air entrained with spray material and to transform that air in terms of increasing its velocity, lowering its pressure and lowering its temperature.

Optionally the apparatus comprises a heater arranged to heat the second flow.

DRAWING

Some preferred embodiments of the invention will be described by way of example and with reference to FIG. 1, which schematically illustrates cold spraying apparatus for forming a three-dimensional object.

DETAILED DESCRIPTION

The apparatus has an electric motor driven air compressor 1 which takes in and compresses atmospheric air. The air is then filtered by an auto-draining filter 2 and stored in a reservoir 3 sized to reduce pressure variations caused by the cycling action of compressor 1. Next in the air train is a refrigeration type de-humidifier 4 which receives air from the reservoir 3 and dehumidifies it. The air at that point is suitable for use as a process gas. The air then splits into two streams each with its own path.

The first path is a powder conveyance line A which supplies air into which spray powder is fed. That line incorporates a controllable pressure dropping element 5, a flow sensor 6 and a powder feeder 7. Spray powder from the feeder 7 is fed into the air stream and conveyed to a supersonic nozzle 8 by a coaxial injector (not shown).

The second path is a main process line B which supplies a flow of process gas (air in this case) used to give velocity to the spray particles. The process line incorporates a pressure control device 9 (eg to reduce the pressure of the air as desired) and a gas heater 10. The heater heats the air to provide it with the desired level of energy.

Air plus spray powder from the powder conveyance A line converges with energised air from the main process line just prior to the nozzle inlet 8*a*. In the preferred embodiment the nozzle 8 is a De Laval style converging-diverging item, sufficient to transform the low velocity—high pressure—high temperature air from the process line to high velocity—low temperature—low pressure air at its outlet 8*b*. The high velocity powder stream emanating from the nozzle is used for cold spraying a substrate to form a target three-dimensional item.

In the preferred embodiment shown, powder conveying air from the conveyance line A will only flow into the nozzle injector, and therefore the nozzle 8, if the pressure in that line is higher than the pressure in the main process line B. The pressure control device 9 is provided for this reason; it adjusts (eg reduces) air pressure in the main process line B so that powder can convey from the powder conveyance line A through to the nozzle injector.

The pressure control device 9 is manually adjustable so that a human operator can set it to reduce the impact of variations in compressor pressure. Generally this element need not be servo-mechanical.

An important aspect of the preferred embodiment lies in the manner in which the cold spraying apparatus is controlled. The pressure dropping element 5, which may comprise a servo-mechanical pressure regulator, is controlled by a signal from an electronic controller 11. This controller has a tuned proportional-integral-differential (PID) function implemented in software.

The controller 11 takes a flow pressure measurement signal from the flow sensor 6 as one input, and an external signal as another input. In combination, the flow sensor 6, pressure dropping element 5 and controller 11 form a control system. That system is able to control the flow rate of a powder conveying gas through the conveyance line A to a specific rate. This rate is regulated in reference to an external signal fed in to controller 11.

By controlling the flow rate of the powder conveying gas through the powder conveyance line A, it is possible to maintain the spray powder flow rate above a minimum at which the powder will clog or convey through to the injector and nozzle sub-optimally. It is important to minimise the powder conveying gas to process gas (in this case 'air') ratio, to maximise the temperature of the gas supplied to the nozzle 8. This is facilitated by heating the process gas with the heater 10. As a result, the larger the fraction of powder conveying gas mixed into the total gas supplied to the nozzle 8, the lower the gas temperature, and the slower the eventual speed of the projected spray powder.

In the preferred embodiment the cold spray apparatus has a well-functioning control system relying on a minimum number of sensing and controlling features, while maintaining a high level of control and stability. Known high pressure cold spray solutions measure and control gas temperature, pressure and flow rate for the main process line, and sometimes also for a powder conveying line. The inventor has found that simplifying the control system has, in at least the preferred embodiment, the desired benefit of improving stability over many known set-ups as there are fewer control systems to "hunt" and compete with each other.

In the preferred embodiment the correct rate of gas flow is important for achieving high quality material outputs. In this case quality outputs are achieved by tightly controlling the flow rate to specific values in order to maintain consistent particle velocities.

In the preferred embodiment the air through the powder conveyance line A; ie that which transports the spray powder to the nozzle injection point, is not heated. On the other hand, the air in the main process line B is heated to high levels to provide sufficient energy for particle acceleration when passing through the nozzle 8. Therefore, there results a temperature difference between the air in powder conveying line compared to that the main process line. Excessive flow rates for the cooler conveyance line A will reduce the gas temperature at the nozzle's inlet when it combines with the hotter air of the main process line B. This results in a reduction of spray particle velocity. Poor quality results are consequent of poor control over particle velocity; therefore, it is desirable to stabilize and limit the maximum rate of air flowing through the injection tube. The preferred embodiment does so.

In the case of the powder/air feed, the preferred embodiment ensures that there is a minimum level of air flow through the powder conveying line A to lubricate powder as it is conveyed to the nozzle. It is possible to establish a lower mass rate limit (where the flow clogs) and a higher mass rate limit (where the nozzle temperature becomes unduly cooled). This ideal setting above the lower and below the upper limits is used as a target value in the control system which is in turn able to control air flows by measuring volume flow rate or mass flow rate, and using a controllable pressure drop to stabilise the flow to the optimal rate.

In order to simplify the control system, the preferred embodiment controls in real time the parameters for only the powder conveyance line A. This is in distinction to the prior art where the focus is on real time control of the parameters of the main process line. While the parameters of flow in the main process line are not adjusted while the apparatus is cold spraying, they can of course be adjusted/set to the necessary values beforehand.

As the geometry of the nozzle is known, as is the gas pressure and temperature in the main process line, the mass flow can be determined. Using this knowledge, the mass flow in the main process line B is calculated by setting (as opposed to controlling) component parameters. These parameters include one or more of air temperature (eg via heater 10), air pressure and pressure drop (eg at element 5). Setting these parameters allows one to both predict and regulate mass flow in an open loop control sense, without measuring and controlling it directly.

It is preferable to rely on the behaviour of a converging-diverging supersonic nozzle as one parameter for determining parameters for the spray material leaving the nozzle 8. In the preferred embodiment it is important to regulate, in real time, the flow rate through the powder conveying line A for process stabilisation. Tight real time control of the flow rate is then the only requirement for smooth and continuous cold spray process performance, avoiding the need for complex temperature and pressure controls.

An advantage of the elimination of real-time control for the main process line B is that lower flow rate sensors can be used than would otherwise be the case.

In the preferred embodiment it is desirable to ensure that the pressure and temperature of air fed to the nozzle 8 is less time variant. Time variance is in part limited by way of the gas reservoir 3 in the conveyance line B which reduces air pressure fluctuations. If fluctuations are not controlled or averted then time variant changes may lead to undesired fluctuations in the resulting spray particle velocity and thus reduced quality of the three-dimensional object produced.

By controlling flow only on the powder conveyance line A, and allowing air flow in the main process line B to be determined by incoming air pressure, set temperature and nozzle geometry, hunting and instability in the system can be obviated or reduced. The system cost may also be relatively low, involving only one small flow rate control system on the powder feed, and no pressure control on the main process line B.

Real time control of air parameters in the powder conveyance line A is effective for creating cold spray system stabilization. In the preferred embodiment, the controller 11 is used to alter air pressure in order to achieve an identified optimal flow rate. This assists in keeping pressure for the powder conveyance line A lower than that of the main process line B and in keeping variation of air temperature at the nozzle 8 as low as possible.

Controlling the powder conveyance line A rather than the main process line B is also useful because small fluctuations within the powder conveyance line have higher relative impact on the system stability.

In the preferred embodiment it has been found that a useful spray material flow rate out of the nozzle 8 can be achieved by having a 30.5 bar pressure at the supply of the powder conveying section, and a 30 bar pressure at the outlet of the nozzle injector—the pressure drop being 0.5 bar. Assume a system fluctuation where the pressure at the nozzle injector would decrease from 30 bar to 29.5 bar (for some reason), then the pressure drop doubles to 1 bar. The resulting flow rate goes from 0.71K to 1K, an approximate 50% increase. This small 1.7% pressure change (0.5 bar in relation to the 30 bar) can increase the powder conveying flow by a substantial 50%. This high sensitivity, illustrates that maintaining a tight and effective control of the pressure in the powder conveyance line is beneficial for system stability.

While the preferred embodiment uses air for the process gas, in other embodiments alternative gases may be used, for example liquid nitrogen or helium. Air is preferred as it can be continually compressed as it is used, without having to be highly compressed into bottles, meaning that the emergence temperature is not cryogenic and smaller heaters can be used than would otherwise be the case. This may reduce process costs further by reducing energy consumption.

In the preferred embodiment the apparatus measures gas flow rate with a small sensor through the powder feeder 7 and injector, and controls the pressure dropping element 5 to maintain an ideal spray particle mass flow rate flow in the powder conveyance line A.

While some preferred embodiments of the invention have been described by way of example, it should be understood that modifications and improvements can occur without departing from the scope of the following claims.

The invention claimed is:

1. Apparatus for producing a three-dimensional object by spray deposition comprising:
    a powder conveyance first line arranged to channel a flow of spray material entrained in a carrier gas to a nozzle a first flow, the powder conveyance first line consisting essentially of a pressure sensor, a temperature sensor, a pressure dropping element, a spray material feeder supplying spray powder to the carrier gas, and a controller controlling the flow of the spray material entrained in the carrier gas while effective spray deposition on a substrate occurs;
    a process second line arranged to channel a flow of gas to the nozzle a second flow, the process second line consisting essentially of a pressure element setting air pressure and a heater setting temperature, wherein the pressure element and the heater are set prior to deposition and are not controlled in real time;
    and a spray nozzle, wherein both the conveying first line and the process second line are upstream of the nozzle;
    the apparatus being such that the pressure and temperature parameters of the first flow are controlled in real time to maintain pressure within the powder conveyance first line above the pressure in the process second line, the pressure and temperature parameters of second flow are not controlled in real time, and the flow of the process second line merges with the flow of the first line to cause spray material to be propelled from the nozzle to a substrate to create a three-dimensional object.

2. Apparatus according to claim 1, wherein the controller controls the amount of spray material fed into gas moving through the powder conveyance first line.

3. Apparatus according to claim 1, wherein the first and second lines receive gas from a common reservoir.

4. Apparatus according to claim 3, wherein there is a filter which filters gas prior to it entering the reservoir.

5. Apparatus according to claim 1, wherein the gas in each case comprises compressed air.

6. Apparatus according to claim 5, wherein the compressed air is run through a dehumidifier prior to entering the first and second lines.

7. Apparatus according to claim 1, wherein:
    a) the pressure and temperature sensors for gas in the powder conveyance first line communicate readings to the controller which, in response to the readings, causes adjustments to the pressure and temperature of the gas in the powdered conveyance first line to provide the spray material with desired spray characteristics as it leaves the nozzle;
    b) the controller controls the amount of spray material fed into gas moving through the powdered conveyance first line;
    c) there is a common reservoir from which the first and second lines receive gas;
    d) there is a filter which filters gas prior to it entering the reservoir;
    e) the gas in each case comprises compressed air; and
    f) the compressed air is run through a dehumidifier prior to entering the first and second lines.

8. Apparatus according to claim 7, wherein the nozzle is a converging-diverging nozzle arranged to receive air entrained with spray material and to transform that air in terms of increasing its velocity, lowering its pressure and lowering its temperature.

* * * * *